L. RAY.
HUB ATTACHING DEVICE.
APPLICATION FILED DEC. 11, 1909.
982,300.
Patented Jan. 24, 1911.
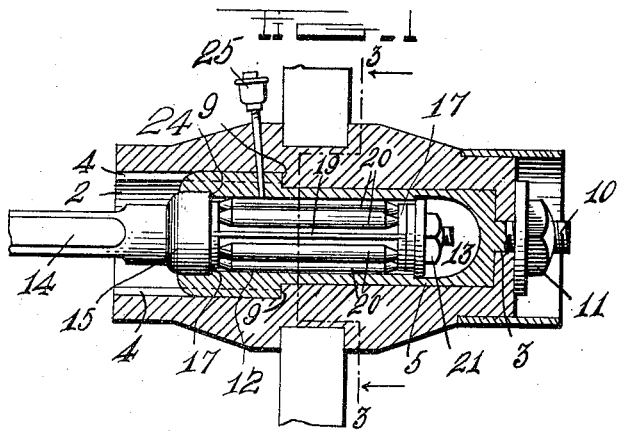
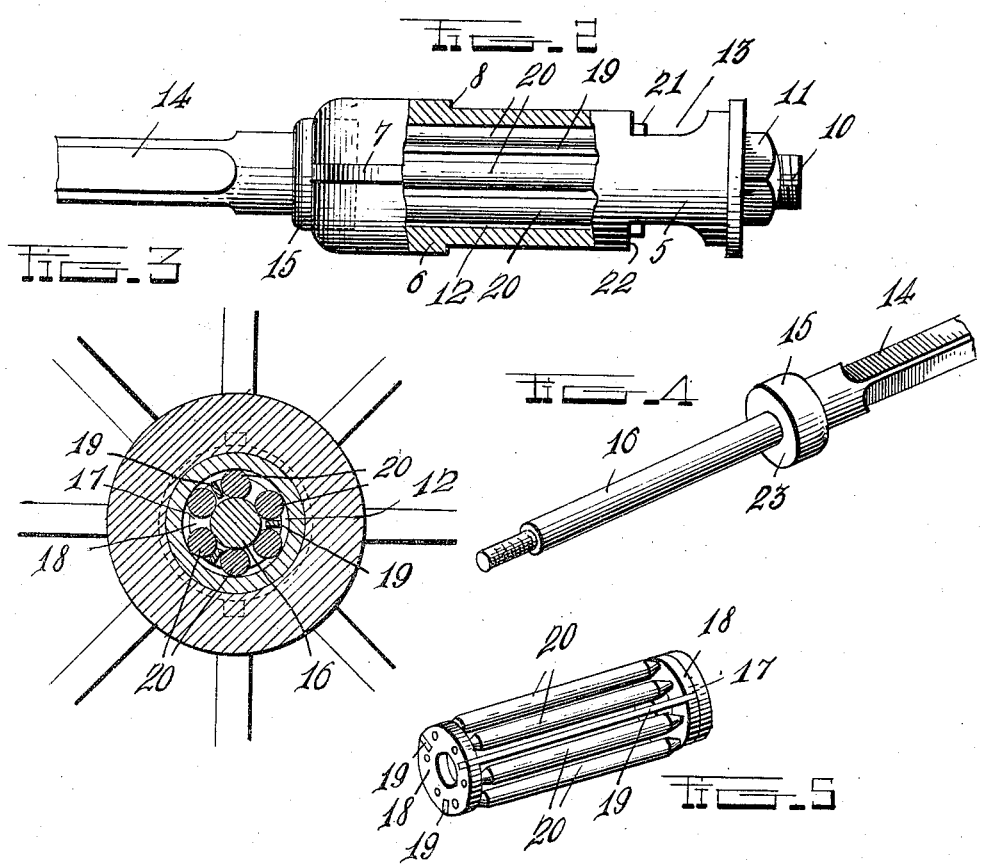
Witnesses
C. P. Hardy
C. H. Griesbauer
Inventor
Louis Ray
by H. B. Willson & Co.
Attorneys

UNITED STATES PATENT OFFICE.

LOUIS RAY, OF HAMLET, INDIANA.

HUB-ATTACHING DEVICE.

982,300. Specification of Letters Patent. Patented Jan. 24, 1911.

Application filed December 11, 1909. Serial No. 532,694.

*To all whom it may concern:*

Be it known that I, LOUIS RAY, a citizen of the United States, residing at Hamlet, in the county of Starke and State of Indiana, have invented certain new and useful Improvements in Hub-Attaching Devices; and I do declare the following to be a full, clear, and exact description of the invention, such as will enable others skilled in the art to which it appertains to make and use the same.

My invention relates to improvements in hub attaching devices, and its object is to improve and simplify the construction and operation of devices of this character and thereby render them more practical and efficient.

With this and other objects in view, the invention consists of certain novel features of construction, combination and arrangement of parts as will be more fully described and particularly pointed out in the appended claims.

In the drawing Figure 1 is a longitudinal sectional view of a construction embodying my invention. Fig. 2 is a detailed side elevation of the bearing with parts broken away showing the outline of the box and the position of the rollers therein. Fig. 3 is a transverse sectional view on the line 3—3 of Fig. 1. Fig. 4 is a detailed perspective view of the end of the axle with the bearing cage removed. Fig. 5 is a detailed perspective view of the cage removed from the axle.

Referring more especially to the drawing which represents a vehicle hub which in this instance is provided with a longitudinal socket 2 having an attenuated opening, 3, at its outer end, and being provided with longitudinally extending channels 4. Socket 2 is adapted to receive the box 5, which has formed on its inner end an enlargement 6, with diametrically opposite ribs 7 adapted to enter the channels 4 and lock the box against rotation independently of the hub. The enlargement 6 forms a shoulder 8, which engages a similar shoulder 9, formed in the hub, and prevents excessive outward movement of the box within the hub. In order to secure this box within the hub I provide upon its end a reduced extension 10, which passes through the attenuated opening 3, and is threaded to receive a locking nut or cap 11, which engages the outer end of the hub and holds the box in proper position therein. In this position the box is adapted to receive the axle which will hereinafter be described.

A longitudinal aperture or channel 12 is formed through the box and communicating therewith or forming an exit therefor is a transverse aperture or opening 13, which is adapted to permit the attachment and removal of the locking nut to be spoken of later on. The axle comprises the ordinary metallic body 14, having an annular enlargement 15 formed thereon and beyond the enlargement the axle is reduced as at 16 to receive the roller cage 17. This cage is constructed of the end rings and connecting bars 18 and 19 respectively, and is provided with the rollers 20, which are mounted in the rings between the connecting members 18 and 19. The extremity of the reduced portion 16 is threaded so as to receive the locking nut 21, which is adapted to seat upon a shoulder 22 formed by the aperture 13. The axle is limited in the outward movement by means of a shoulder 23 formed by the reduction of the axle between the annular enlargement 15 and the reduced extension 16, which engages a shoulder 24, formed within the box adjacent its inner end.

In the application of the device the cage is first placed upon the reduced extension, and the box then inserted over the cage, and the lock nut placed in position so as to secure the parts. The box is then inserted into the hub with the ribs 7 engaging the channels 4 and the lock nut 11 is drawn up on the extension 10, thus securing the box within the hub.

A suitable oil cup 25 is passed through the hub and has its oil duct leading directly to the rollers 20, so that the bearing may be continuously oiled.

From the foregoing description taken in connection with the accompanying drawings, the construction and operation of the invention will be readily understood without requiring a more extended explanation.

Having thus described my invention what I claim and desire to secure by Letters Patent is:

In a hub attaching device, the combination with a hub having the outer portion of its bore of reduced size, a wall provided with a central transverse aperture closing in the outer end of the bore, an axle box fitting in the bore of the hub and provided with a transverse cut-away portion, a threaded extension at the outer end of the axle box passing through the aperture of said wall, a nut screwing on the extension of the axle box to hold the latter in operative position in the hub, and means to hold the axle box against rotation independently of the hub.

In testimony whereof I have hereunto set my hand in presence of two subscribing witnesses.

LOUIS RAY.

Witnesses:
 AUGUST LUKEN,
 HJALMER A. ELLINGSON.